(12) United States Patent
Seok et al.

(10) Patent No.: US 9,186,932 B2
(45) Date of Patent: Nov. 17, 2015

(54) ACTIVE SPEED RESTRICTING WHEEL ASSEMBLY

(71) Applicant: Research & Business Foundation SUNGKYUNKWAN UNIVERSITY, Suwon-si (KR)

(72) Inventors: Changsung Seok, Gwacheon-si (KR); Dong Keun Lee, Uljin-gun (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 380 days.

(21) Appl. No.: 13/744,593

(22) Filed: Jan. 18, 2013

(65) Prior Publication Data

US 2013/0193745 A1   Aug. 1, 2013

(30) Foreign Application Priority Data

Jan. 31, 2012  (KR) .................. 10-2012-0009534

(51) Int. Cl.
*B60B 33/00* (2006.01)
*B60B 37/10* (2006.01)

(52) U.S. Cl.
CPC ......... *B60B 33/0084* (2013.01); *B60B 33/0028* (2013.01); *B60B 37/10* (2013.01); *B60B 2200/432* (2013.01); *B60B 2900/331* (2013.01)

(58) Field of Classification Search
CPC .. B60B 33/0028; B60B 33/084; B60B 37/10; B60B 2200/432; B60B 2900/331; B60B 19/06
USPC ............ 301/6.1, 124.1; 188/1.12, 322.5, 290, 188/292, 378; 16/45, 46, 36
See application file for complete search history.

(56) References Cited

U.S. PATENT DOCUMENTS 3,771,628 A * 11/1973 Close ........................ 188/189
4,603,871 A *  8/1986 McNeill .................. 280/33.994

(Continued)

FOREIGN PATENT DOCUMENTS

JP   08-193650      7/1996
JP   08-210261 A    8/1996

(Continued)

OTHER PUBLICATIONS

Korean Office Action issued Dec. 30, 2013 in counterpart Korean Patent Application No 10-2012-0009534. (2 pages in Korean).

(Continued)

*Primary Examiner* — Kip T Kotter
(74) *Attorney, Agent, or Firm* — NSIP Law

(57) ABSTRACT

A speed restricting wheel assembly is provided. The speed restricting wheel assembly includes: a casing of which one side is partially open and forms a circular accommodating hole eccentric from a center; a rotation rotor which is inserted inside the accommodating hole and rotates in an interlocked manner with the casing in a state where it is eccentric from a rotation center of the casing, but which also forms a rotation space inside and a plurality of internal gear teeth dented radially from the rotation space; a sun gear accommodated inside the rotation space and has a plurality of protruding external gear teeth in contact with the internal gear teeth and an axis member mounted onto a rotation center accommodated inside the rotation hole; and a resistance fluid which is accommodated in a space between the external gear teeth and internal gear teeth.

8 Claims, 6 Drawing Sheets

(56) References Cited

U.S. PATENT DOCUMENTS

| | | | |
|---|---|---|---|
| 5,465,986 A * | 11/1995 | MacRae | 280/33.994 |
| 5,860,884 A * | 1/1999 | Jolliff | 475/89 |
| 6,374,954 B1 * | 4/2002 | Cheng | 188/1.12 |
| 6,382,364 B1 * | 5/2002 | Chuang | 188/1.12 |
| 6,474,751 B1 * | 11/2002 | Yamaguchi et al. | 303/116.4 |
| 2003/0031578 A1 * | 2/2003 | Uchiyama et al. | 418/171 |
| 2006/0207838 A1 * | 9/2006 | Kidd et al. | 188/1.12 |
| 2008/0017437 A1 * | 1/2008 | Kurata | 180/429 |
| 2010/0193306 A1 * | 8/2010 | Inaba | 188/292 |

FOREIGN PATENT DOCUMENTS

| | | |
|---|---|---|
| JP | 2010-347720 | 11/2010 |
| KR | 10-2004-0084658 A | 10/2004 |

OTHER PUBLICATIONS

Korean Office Action issued Jun. 18, 2013 in counterpart Korean Patent Application No. 10-2012-0009534. (3 pages in Korean).

* cited by examiner

ACTIVE SPEED RESTRICTING WHEEL ASSEMBLY

CROSS-REFERENCE TO RELATED APPLICATIONS

This application claims priority from Korean Patent Application No. 10-2012-0009534, filed in the Korean Intellectual Property Office on Jan. 31, 2012, the disclosure of which is incorporated herein by reference.

BACKGROUND OF THE INVENTION

1. Field of the Invention

Methods and apparatuses consistent with the exemplary embodiments relate to an active speed restricting wheel assembly, and more particularly, to an active speed restricting wheel assembly which is mounted onto transportation means used in daily lives, to prevent extreme speed acceleration.

2. Description of the Prior Art

Wheels used in transportation means such as strollers, walking assistance devices, wheelchairs, carriers, and shopping carts etc. cause crash accidents due to over-speed rotation in downhill roads and falling accidents due to high speed rotation by slipping, causing loss of life and property.

In order to resolve this, a transmission which uses a planetary gear and a vehicle using such a transmission were developed and filed for patent application (10-2006-0119401). This patent application proposed a planetary gear transmission which consists of a multi-stage gear transmission unit which includes two carriers wherein two planetary gear trains are combined to integrate a carrier of a planetary gear train on one side with a ring gear of a planetary gear train on the other side, the two carriers operating separately by a driving side and an output side cooperate to form a housing of the transmission, and having a plurality of planetary gears installed in each carrier; two or more solar gears which interlock with each gear of the planetary gears and have a plurality of concaves for being combined with a home cam on an inner circumference; and two ring gears interlocked with the planetary gears; a central axis where the multi-stage gear transmission unit is installed; and a transmission control unit which fixates one of the plurality of solar gears selectively to the central axis, and controls selective integration of two adjacent solar gears of among the plurality of solar gears.

In addition, as an apparatus for restricting speed, an auxiliary apparatus for safety in in-line skating was filed for patent application (20-2007-0019331). This invention related to a safety apparatus for restricting rolling of an in-line skate wheel for safety in in-line skating, the apparatus comprising a side support fixture located in both sides of an in-line skate wheel, a gutter hook formed on the side support fixture, an elastic foam combined with the side support fixture, and a fastener which controls a distance of the side support fixture.

However, these aforementioned existing speed restricting wheels have relatively complex structures, and thus due to their high production costs, there has been difficulty in widely applying such wheels to transportation means used in daily lives.

SUMMARY OF THE INVENTION

1. Technical Problem to be Solved

Therefore, the purpose of the present invention is to resolve the aforementioned problems, and more particularly, to provide an active speed restricting wheel assembly which is mounted onto transportation means to prevent extreme speed acceleration, thereby maintaining stability.

2. Means for Solving the Problem

According to the present invention, the above purpose is achieved by an active speed restricting wheel assembly which includes a casing of which one side is partially open and forms a circular accommodating hole eccentric from a center, and of which a rotation hole is formed in a center of the other side; a rotation rotor which is inserted inside the accommodating hole and rotates in an interlocked manner with the casing in a state where it is eccentric from a rotation center of the casing, but which also forms a rotation space inside and a plurality of internal gear teeth dented radially from the rotation space; a sun gear which is accommodated inside the rotation space, and has a plurality of outwardly protruding external gear teeth in contact with the internal gear teeth and an axis member mounted onto a rotation center accommodated inside the rotation hole; and a resistance fluid which is accommodated in a space between the external gear teeth and internal gear teeth, and is compressed according to a space between the rotation rotor and sun gear deformed according to rotation of the rotation rotor.

In addition, the number of the internal gear teeth may be greater than the number of the external gear teeth.

In addition, the internal gear teeth and external gear teeth may be trochoid type gear teeth.

The rotation rotor may rotate around the sun gear which is in a halt condition when the casing rotates.

In addition, a fluid flow route may be formed on the sun gear to penetrate the sun gear such that resistance fluid of both sides is mutually connected around any one of the external gear teeth.

In addition, a rotation center of the rotation rotor may move along a circular orbit which has a rotation hole of the casing as the center, when the rotation rotor rotates.

3. Effects of the Invention

According to the present invention, there is provided an active speed restricting wheel assembly which may actively restrict rotation speed of a wheel through a relatively simple structure using a trochoid type gear.

In addition, it is possible to secure accuracy and stability of driving by filling incompressible resistance fluid having high viscosity, in a space between a rotation rotor and sun gear.

In addition, it is possible to easily control a degree of an overall rotation speed and speed restriction, by designing a fluid flow route where resistance fluid may flow, inside the sun gear.

BRIEF DESCRIPTION OF THE DRAWINGS

The above and/or other aspects of the present disclosure will be more apparent by describing certain present disclosure with reference to the accompanying drawings, in which.

DETAILED DESCRIPTION OF THE INVENTION

Figure 1:
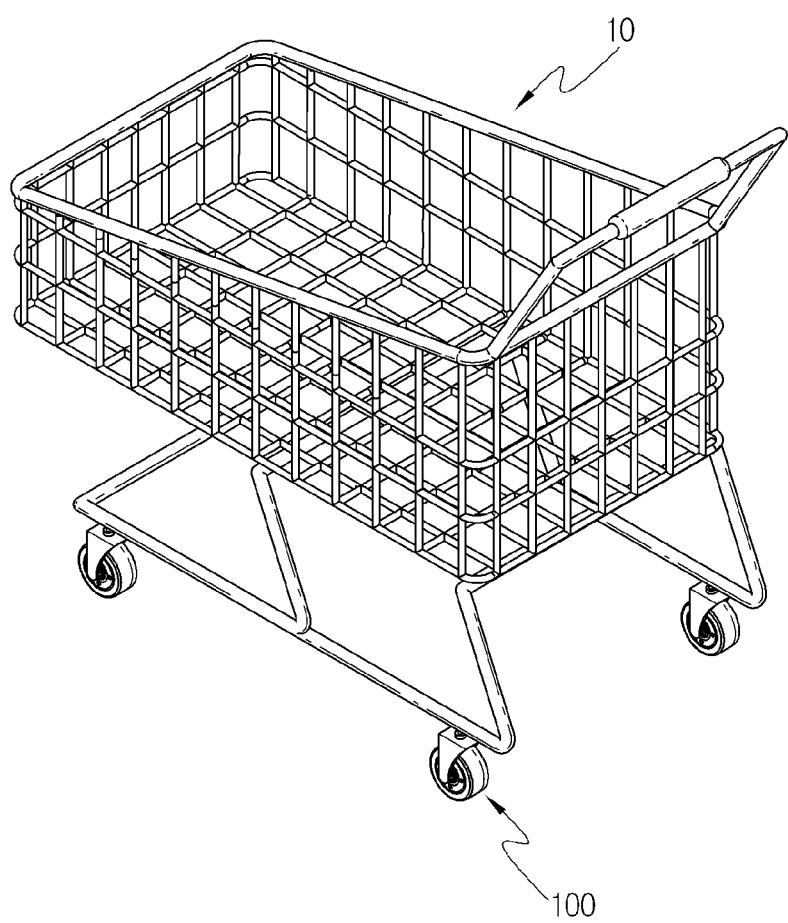
FIG. 1 is a view illustrating an example of transportation means mounted with an active speed restricting wheel assembly, according to a first exemplary embodiment of the present invention.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

An active speed restricting wheel assembly 100 according to a first exemplary embodiment of the present invention will be explained in detail with reference to the accompanying views.

Figure 2:
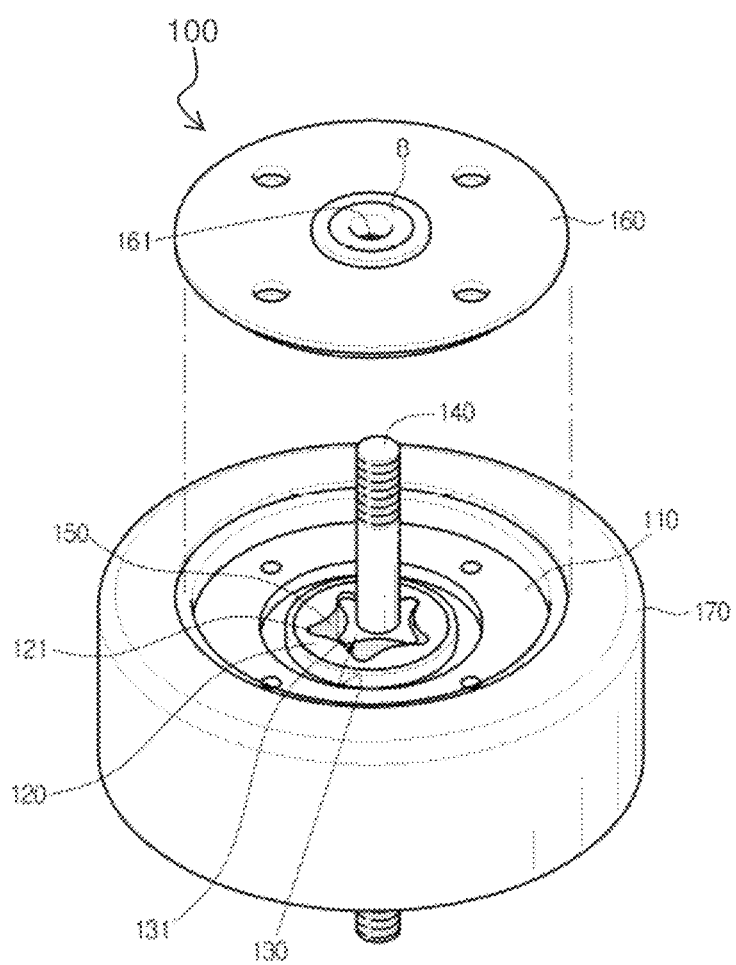
FIG. 2 is a perspective view of an active speed restricting wheel assembly according to a first exemplary embodiment of the present invention.
Figure 3:
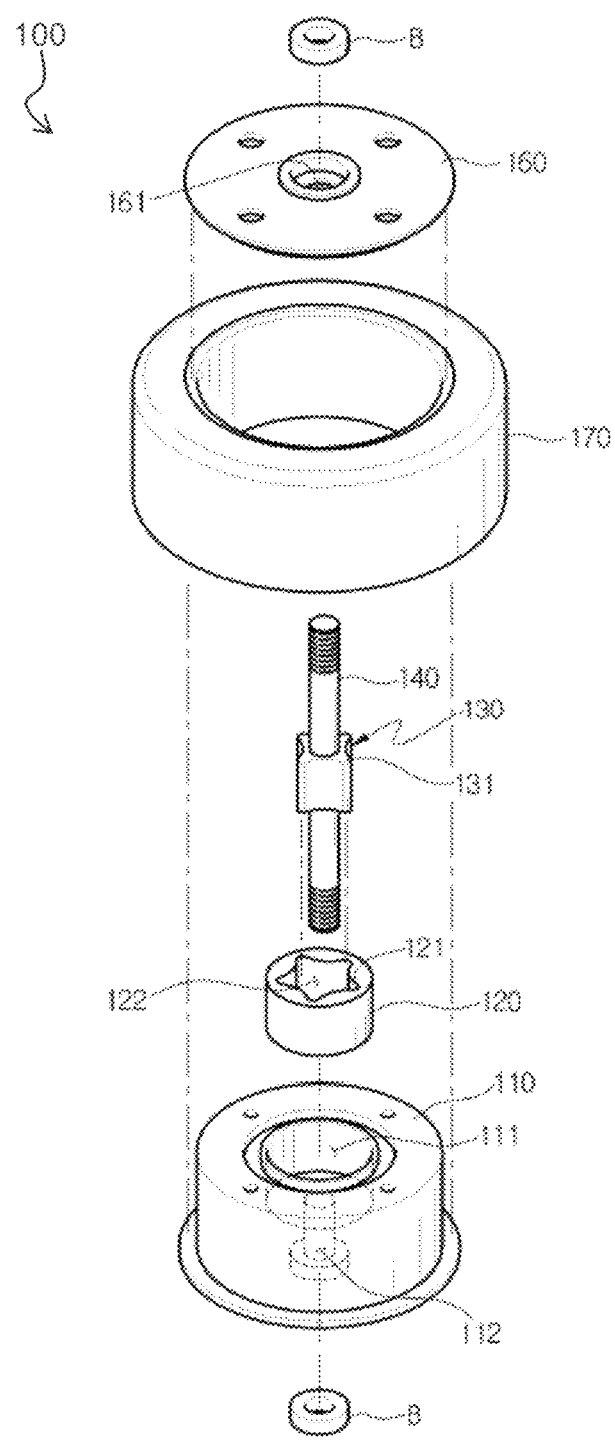
FIG. 3 is an exploded perspective view of an active speed restricting wheel assembly of FIG. 2.
Figure 4:
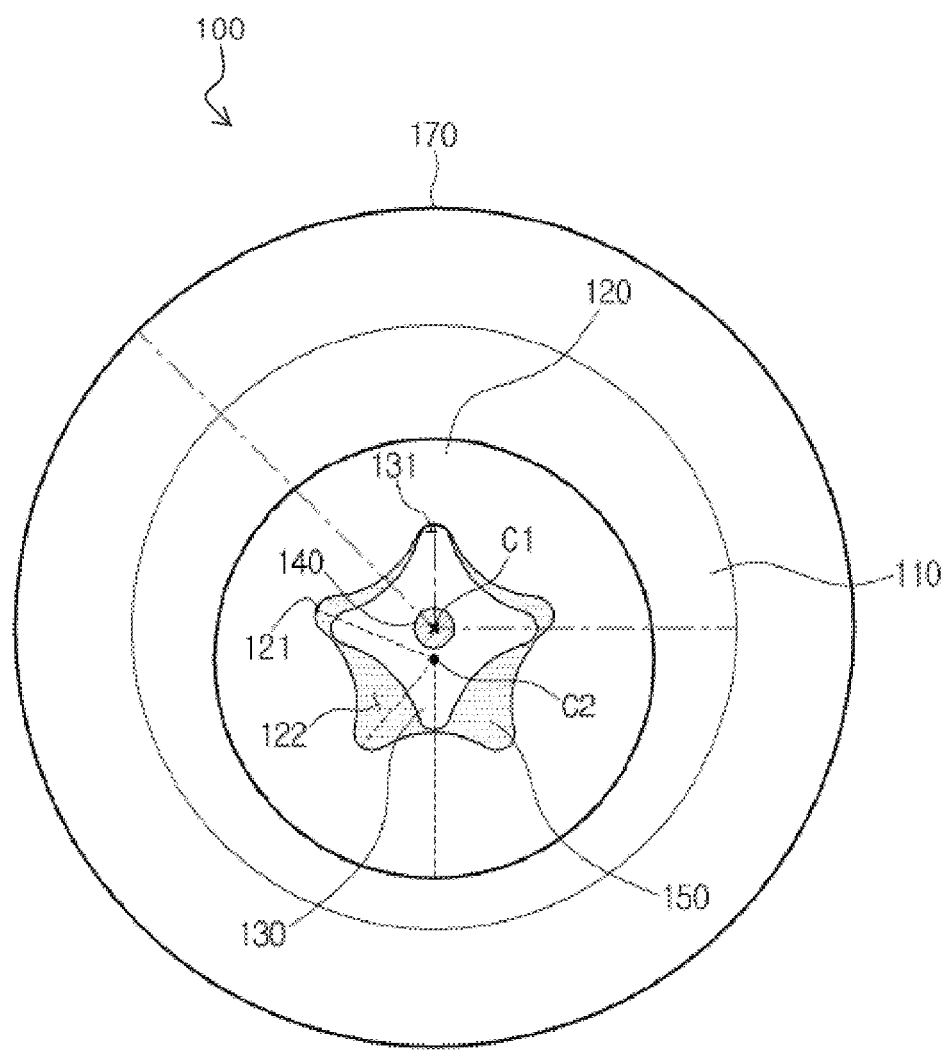
FIG. 4 is a front view of an active speed restricting wheel assembly of FIG. 2.

FIG. 1 is an illustration of an example of transportation means mounted with an active speed restricting wheel assembly according to a first exemplary embodiment of the present invention, FIG. 2 is a perspective view of an active speed restricting wheel assembly according to a first exemplary embodiment of the present invention, FIG. 3 is an exploded perspective view of an active speed restricting wheel assembly of FIG. 2, and FIG. 4 is a front view of an active speed restricting wheel assembly of FIG. 2.

With reference to FIGS. 1 to 4, an active speed restricting wheel assembly 100 according to a first exemplary embodiment of the present invention is an assembly mounted onto predetermined transportation means 100 to prevent instant acceleration and induce stable movement, The active speed restricting wheel assembly includes a casing 110, rotation rotor 120, sun gear 130, cover member 160, and wheel member 170.

The casing 110 is a cylinder type member which has the wheel member 170 on its external circumference, and thus rotates simultaneously with the wheel member 170 which is in contact with the ground.

Meanwhile, one side of the casing is open such that a circular accommodating hole 111 is formed, and a center C2 of the circular accommodating hole 111 is distanced and eccentric from a rotation center C1 of the casing 110. In other words, due to rotation of the casing 110 which rotates together with the wheel member 170, the center C2 of the accommodating hole 111 makes rotational motion with a certain radius from the rotation center C1 of the casing 110.

In addition, on the other side of the casing 110, a rotation hole 112 is formed on the rotation center C1 of the casing 110 so as to accommodate the axis member 140 connected with the sun gear which is to be explained hereinafter.

In other words, one side of the casing 110 is open to form an accommodating hole 111, while the other side of the casing 110 is closed with the rotating hole formed only on the rotation center C1 of the casing 110.

The rotation rotor 120 is accommodated inside the accommodating hole 111 in a rotatable manner, and is formed in a cylinder type having a size corresponding to a bottom depth of an internal diameter of the accommodating hole 111. Rotation space 122 is formed in a center of the rotation rotor 120, and a plurality of internal gear teeth 121 are formed radially and dented from the rotation space 122.

Therefore, since the rotation rotor 120 is accommodated inside the accommodating hole 111, the rotation center C2 of the rotation rotor 120 rotates as it contacts the inner circumference of the accommodating hole 111 in a state where it is distanced and eccentric from the first center C1, which is the rotation center of the casing 110. Meanwhile, the rotation center of the rotation rotor 120 becomes a second center C2, which will be explained hereinafter.

The sun gear 130 is accommodated inside the rotation space 122 of the rotation rotor 120. In addition, the sun gear 130 is fixated and maintains a halt condition unlike other constituents, and has a plurality of outwardly protruding external gears teeth 131.

Meanwhile, an internal gear tooth 121 of the rotation rotor 120 and an external gear teeth 131 of the sun gear 130 are formed as trochoid type gears, and such that the number of teeth of the internal gear teeth 121 is one more than the number of teeth of the external gear teeth 131. In addition, although such numbers of teeth are not limited thereto, the present exemplary embodiment has 5 internal gear teeth 121 and 4 external gear teeth 131.

The axis member 140 fixated to the rotation center C1 of the sun gear 130 protrudes towards outside of the casing 110, to be mounted and fixated to the predetermined transportation means, in a state where it is accommodated inside the rotation hole 112 of the casing 110. Therefore, when the transportation means 10 mounted with the active speed restricting wheel assembly of the present exemplary embodiment moves, the sun gear 130 fixated to the transportation means 10 maintains its halt condition without rotating.

The resistance fluid 150 is fluid of oil material which prevents rapid increase of speed of the rotation rotor 120 which rotates around the sun gear 130 which is in a halt condition. The resistance fluid 150 is oil with high viscosity filled inside the rotation space 122 where the sun gear 130 is accommodated.

Therefore, as the resistance fluid 150 is compressed by a location change of the sun gear 130 inside the rotation space 122 which occurs from a rotation of the rotation rotor 120, the rotation rotor 120 is prevented from rotating extremely, and the overall rotation speed of the wheel assembly can be controlled as well.

The cover member 160 is a flat type member which is mounted onto the casing 110 to finish the side of the casing 110 which is opened by the accommodating hole 111. The cover member 160 has a rotation hole 161 formed on a location corresponding to the rotation center C1 of the casing 110.

That is, the cover member 160 finishes the accommodating hole 111 which is mounted onto the side of the casing 110 and accommodates the rotation rotor 120 and the sun gear 130. Furthermore, inside the rotation hole 161 of the cover member 160, the cover member 160 supports the sun gear 130 as it accommodates the axis member 140 which is mounted onto the sun gear 130.

At the same time, the cover member 160 performs a role of sealing the resistance fluid 150 filled inside the casing 110 so that it does not trickle out. Furthermore, in order to prevent leakage of the resistance fluid 150 more rigidly, an additional o-ring may be inserted between a circumference of the casing 110 and the cover member 160.

Meanwhile, for smooth rotating of the cover member 160 and casing 110 around the axis member 140 of the sun gear 130, it is desirable that an additional bearing B is installed between the axis member 140 of the sun gear 130 and between the axis member 140 of the sun gear 130 and the casing 160.

The wheel member 170 is mounted onto and fixated to the outer circumference of the casing 110, and this is a member which directly contacts the ground to generate friction. There is no limitation to the material of the wheel member 170, and any material may be used as long as it can increase the frictional force of contact with the ground.

Operations of the first exemplary embodiment of the aforementioned active speed restricting wheel assembly 110 will be explained hereinbelow.

Figure 5:
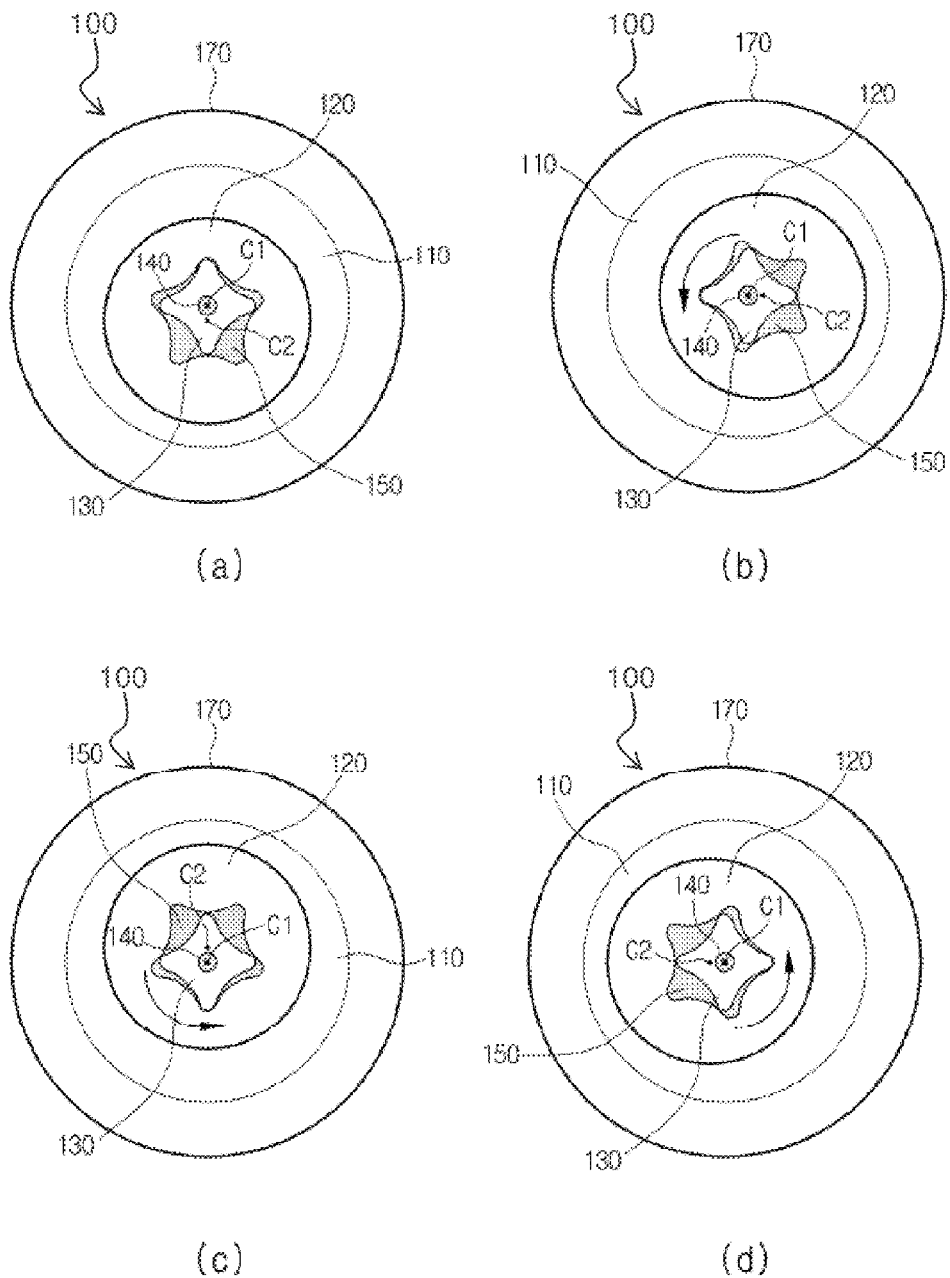
FIG. 5 is a sketchy view of operations during driving of an active speed restricting wheel assembly of FIG. 2.

FIG. 5 is a sketchy illustration of operations during driving of an active speed restricting wheel assembly of FIG. 2.

With reference to FIG. 5, first of all, in a state where the active speed restricting wheel assembly 100 of the present exemplary embodiment is mounted onto the predetermined transportation means 10, when transportation force is applied to the transportation means 10, the wheel member 170 rotates by frictional force while it is in contact with the ground.

In a state where the sun gear 130 is fixated to the transportation means 10, when the casing 110 which is combined with the wheel member 170 rotates on the first center C1 as the center, the rotation rotor 120 accommodated to the accommodating hole 111 of the casing 110 rotates as it contacts the sun gear 130 which is in a halt state. That is, interlocked with the rotation of the casing, the rotation rotor 120 rotates along the same rotation direction, as each of the internal gear teeth 121 interlocks with each of the external gear teeth 131 of the sun gear 130 which are formed on the rotation rotor 120.

In other words, the casing 110 rotates around the first center C1 as the center, and the rotation rotor 120 accommodated to the accommodating hole 111 in an eccentric state rotates around the second center C2, interlocked with the rotation movement of the casing 110. In addition, together with the rotation of the rotation rotor 120 itself, the second center C2 which becomes the rotation center of the rotation rotor 120 rotates as it forms a circular orbit around the first center C1. Therefore, the second center C2 which is eccentric from the first center C1 which is the rotation center of the casing 110 moves its location on a predetermined orbit along the rotation of the casing 110.

Herein, in a case where excessive force is applied to the transportation means 10, that is, when the casing 110 is rapidly accelerated, an internal gear tooth 131 and external gear tooth 121 rotating and mutually contacting each other change orders, and in the process where an external gear tooth 121 is inserted inside an internal gear tooth 131, the resistance fluid 150 filled inside the internal gear tooth 131 cannot escape quickly. In this process, the resistance fluid 150 receives compressive force by the external gear tooth 131 being inserted into, and the delay of time escaping from the internal space of the internal gear tooth 121 of the resistance fluid 150 which is in a liquid state of high viscosity, reducing the speed at which the external gear tooth 131 is inserted inside the internal gear tooth 121, also restricting the rotation speed of the casing 110 and wheel member 170.

However, in a case where the rotation speed of the casing 110 is slow or rapid acceleration is not generated, the resistance fluid 150 can sufficiently escape through a minute gap formed between the internal gear tooth 121 and external gear tooth 131 during rotation of the rotation rotor 120, thereby forming a stable flow and maintaining a stable speed.

Next, an active speed restricting wheel assembly 200 according to a second exemplary embodiment of the present invention is explained in detail hereinbelow.

Figure 6:
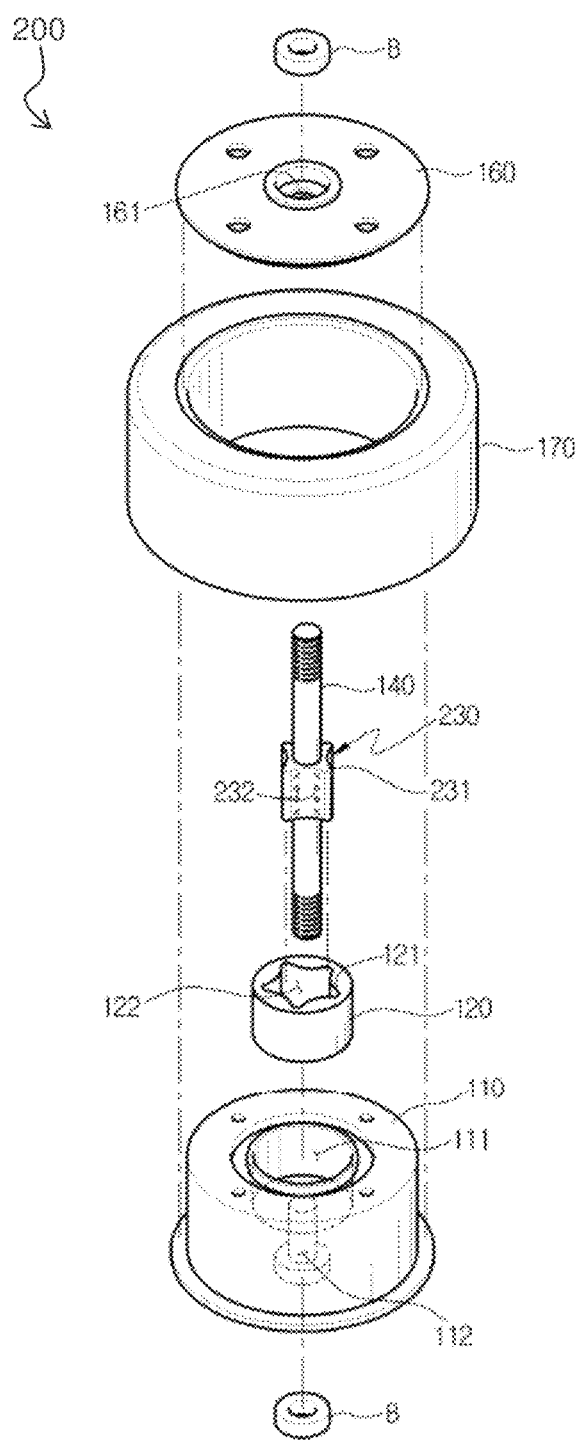
FIG. 6 is an exploded perspective view of an active speed restricting wheel assembly according to a second exemplary embodiment of the present invention.

FIG. 6 is an exploded perspective view of the active speed restricting wheel assembly according to the second exemplary embodiment of the present invention.

With reference to FIG. 6, the active speed restricting wheel assembly 200 according to the second exemplary embodiment of the present invention includes a casing 110, rotation rotor 120, sun gear 230, resistance fluid 150, cover member 160, and wheel member 170.

However, the casing 110, rotation rotor 120, resistance fluid 150, cover member 160, and wheel member 170 of the present exemplary embodiment are the same as the aforementioned constituents of the first exemplary embodiment, and thus repeated explanation is omitted.

Just as in the first exemplary embodiment, the sun gear 230 is a member accommodated inside the rotation space 122 of the rotation rotor 120 and fixated so as not to rotate, and has a plurality of external gear teeth 231 protruding.

However, the sun gear 230 of the present exemplary embodiment has a fluid flow route 232 penetrating the sun gear 230 and which connects one side of the external gear tooth 231 with the other side penetrating the sun gear 232. In addition, by the rotation of the rotation rotor 120, the resistance fluid 150 may flow not only into a space between the external gear tooth 231 of the sun gear 230 and the internal gear tooth 121 of the rotation rotor 121, but also inside the fluid flow route 232.

Therefore, according to the present exemplary embodiment, an additional fluid flow route 232 where the resistance fluid 150 can flow is formed on the sun gear 230, thus enabling flexible rotation operations.

In addition, it is possible to control the effect of controlling the rotation speed of the casing 110 by controlling the count and inside caliper etc. of the fluid flow route 232 formed on the sun gear 230, thereby controlling the flowing volume of the resistance fluid 150.

Although a few embodiments of the present invention have been shown and described, it would be appreciated by those skilled in the art that changes may be made in this embodiment without departing from the principles and spirit of the invention, the scope of which is defined in the claims and their equivalents.

DESCRIPTION OF REFERENCE NUMERALS

100: ACTIVE SPEED RESTRICTING WHEEL ASSEMBLY ACCORDING TO FIRST EXEMPLARY EMBODIMENT OF PRESENT INVENTION
110: CASING
120: ROTATION ROTOR
130: SUN GEAR
140: AXIS MEMBER
150: RESISTANCE FLUID
160: COVER MEMBER
170: WHEEL MEMBER

What is claimed is:
1. An active speed restricting wheel assembly comprising:
a casing having a first side partially open and forming a circular accommodating hole eccentric from a rotation center of the casing and a second side having a rotation hole at a center of the casing;
a rotation rotor inserted inside the accommodating hole, wherein the rotation rotor rotates in an interlocked manner with the casing, wherein a rotation center of the rotation rotor is eccentric from the rotation center of the casing, and having a rotation space formed inside and internal gear teeth dented radially from the rotation space;

a sun gear accommodated inside the rotation space, the sun gear having protruding external gear teeth in contact with the internal gear teeth and an axis member mounted onto a rotation center of the sun gear and accommodated inside the rotation hole of the casing; and a resistance fluid accommodated in a space between the external gear teeth and internal gear teeth, the resistance fluid being compressed according to the space between the rotation rotor and sun gear being deformed according to rotation of the rotation rotor.

2. The active speed restricting wheel assembly according to claim 1, wherein the number of the internal gear teeth is greater than the number of the external gear teeth.

3. The active speed restricting wheel assembly according to claim 2, wherein the internal gear teeth and external gear teeth are trochoid type gear teeth.

4. The active speed restricting wheel assembly according to claim 3, wherein the rotation rotor rotates around the sun gear which is in a halt condition, when the casing rotates.

5. The active speed restricting wheel assembly according to claim 4, wherein a fluid flow route is formed on the sun gear to penetrate the sun gear such that resistance fluid on sides of the sun gear is connected around any one of the external gear teeth.

6. The active speed restricting wheel assembly according to claim 5, wherein the rotation center of the rotation rotor moves along a circular orbit which has a rotation hole of the casing as a center of the circular orbit, when the rotation rotor rotates.

7. The active speed restricting wheel assembly according to claim 1, wherein a fluid flow route is formed on the sun gear to penetrate the sun gear such that resistance fluid on sides of the sun gear is connected around any one of the external gear teeth.

8. The active speed restricting wheel assembly according to claim 7, wherein the rotation center of the rotation rotor moves along a circular orbit which has the rotation hole of the casing as a center of the circular orbit, when the rotation rotor rotates.

* * * * *